Nov. 18, 1947.    M. WETZLER    2,430,900
CLAMPING DEVICE FOR DRILL PRESSES AND THE LIKE
Filed May 30, 1945    2 Sheets-Sheet 1

INVENTOR
MAX WETZLER
BY
ATTORNEY.

Nov. 18, 1947.　　　M. WETZLER　　　2,430,900

CLAMPING DEVICE FOR DRILL PRESSES AND THE LIKE

Filed May 30, 1945　　　2 Sheets-Sheet 2

INVENTOR
MAX WETZLER
BY
ATTORNEY.

Patented Nov. 18, 1947

2,430,900

UNITED STATES PATENT OFFICE 2,430,900

CLAMPING DEVICE FOR DRILL PRESSES AND THE LIKE

Max Wetzler, Long Island City, N. Y.

Application May 30, 1945, Serial No. 596,654

3 Claims. (Cl. 77—63)

The invention relates to clamping devices and more particularly to clamping devices adapted for operative combination with drill presses and the like for the purpose of clamping work-pieces in said press in position to be drilled thereby.

The invention has for its object to provide a novel clamping device which is simple in construction and of maximum efficiency and operation and which may be operatively combined with the drill press and the like with a minimum of effort.

The invention contemplates further a novel clamping device which is capable of operative combination with various types of machines for various classes of work, and which is rapidly adjustable from inoperative to operative positions and vice-versa.

Another object of the invention is to provide a novel clamping device which may be readily mounted on the column of a drill press or an equivalent element, so as to be rotatably and linearly adjustable thereon to various operative positions.

A still further object of the invention is to provide a clamping device of the indicated type embodying an efficient and novel clamping means whereby the work-piece may be effectively and efficiently clamped in place upon the bed-plate of the drill press or the like.

Other objects will appear from the description hereinafter, and the features of novelty will be pointed out in the claims.

In the accompanying drawings which illustrate an example of the invention without defining its limits, Fig. 1 is a fragmentary perspective view showing the novel clamping device incorporated in a drill press;

In its illustrated form, the novel clamping device comprises releasable-mounting means for detachably securing the device in place in a drill press or other machine—said mounting means, as illustrated, consisting of gripping members 5 and 6 pivotally connected with each other at 7 and curved to encircle and grip an element of the drill press such as the column 5—a thereof.

Figure 1:
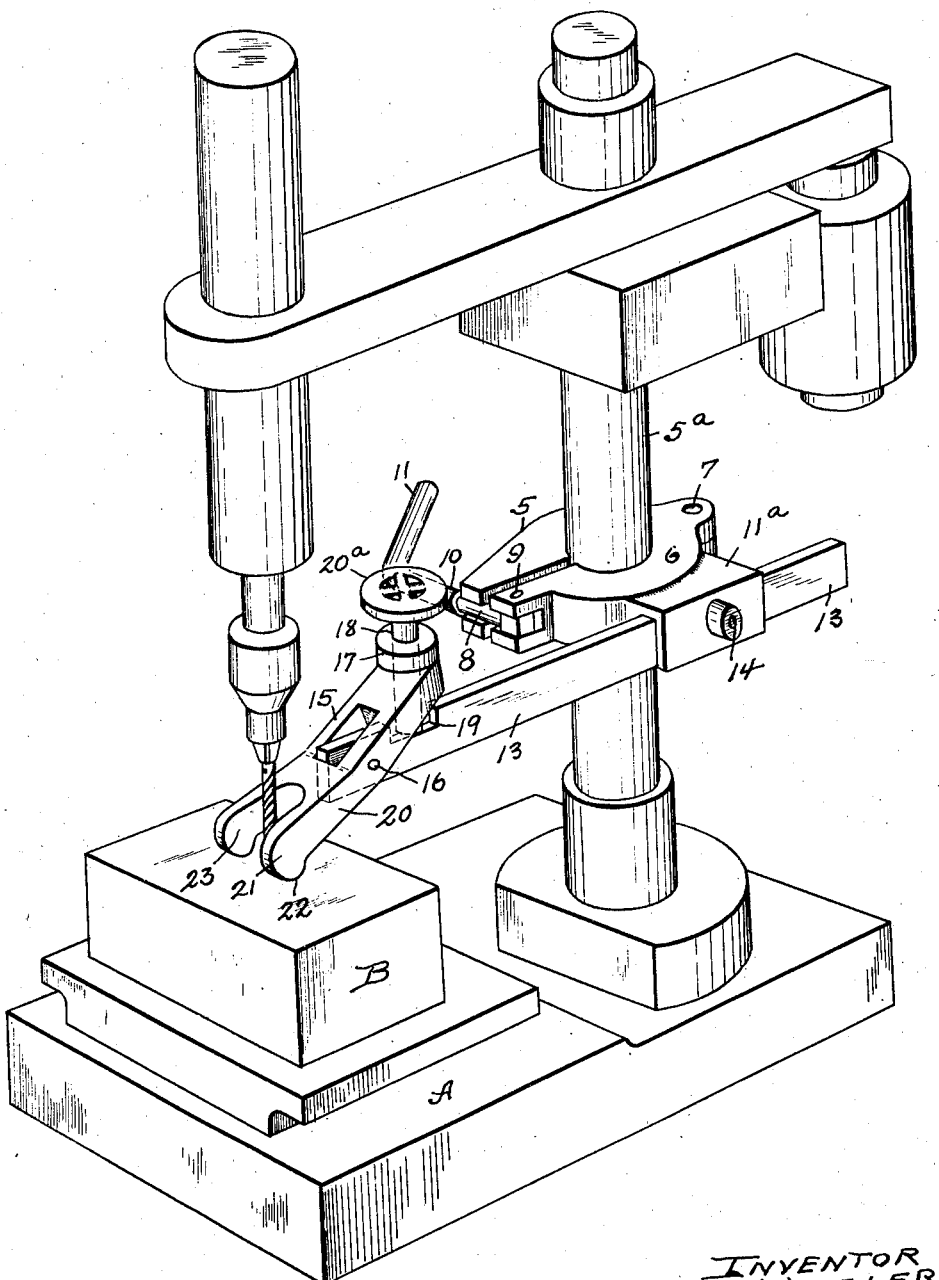
Figure 2:
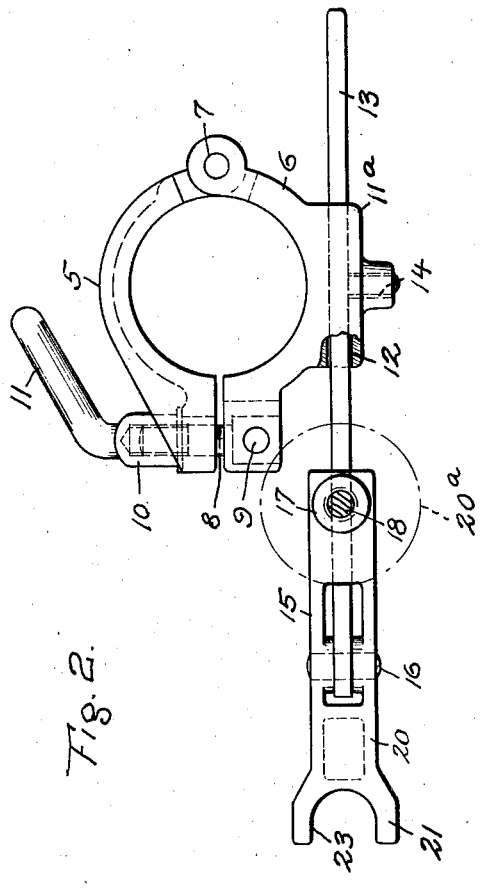
Fig. 2 is a plan view of the novel clamping device.

For the purpose of securing the mounting means in position on the column 5—a or its equivalent, the member 6 may be provided with a threaded member 8 pivoted at 9 and adapted to project through an opening in the gripping member 5 for the reception of a locking nut or member 10 internally threaded for threaded-engagement with said member 8 as illustrated in Fig. 2. A handle 11 may be provided as an integral part of the nut 10 to facilitate the manipulation thereof. It will be understood that the means so far described may be replaced by other equivalent means without affecting the operation or efficiency of the clamping device as such. The member 6 is designed to support a supporting member and preferably includes a bearing 11ª projecting outwardly therefrom, preferably as an integral part of said member 6, and provided with a preferably rectangular slot 12 for the slidable accommodation of a supporting bar 13 dimensioned and shaped to fit said slot 12 as illustrated in Fig. 2. Suitable means may be provided, such as a set screw 14, for fixing the bar 13 in an adjusted position in the bearing 11.

Figure 3:
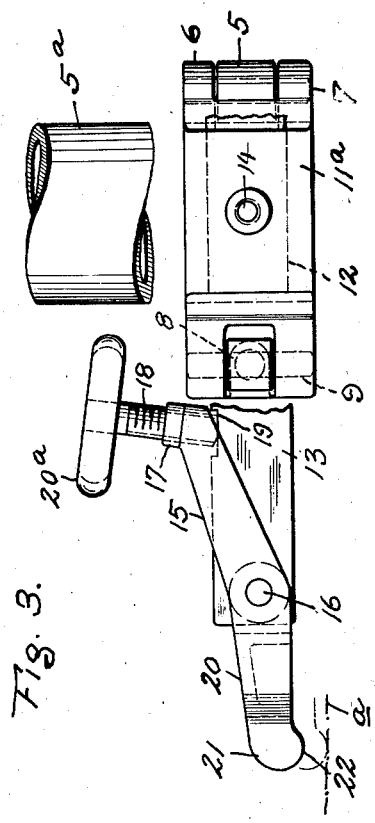
Fig. 3 is a side elevation of said device.

A clamping lever 15 is pivoted at an intermediate point at 16 upon the bar 13 and projects upwardly from said pivot and terminates in an internally-threaded boss 17 which straddles the bar 13 and accommodates a clamping screw 18 adapted to bear against a seat 19 with which the bar 13 is provided, said clamping screw 18 carrying a hand wheel 20ª or equivalent device, for facilitating the operation of said clamping screw 18. The lever 15 is continued beyond the pivot 16 in the form of a pressure member 20 preferably terminating in a forked pressure head 21 preferably provided with a pressure-exerting or clamping projection 22 as illustrated in Fig. 3. The forked pressure head 21 is shaped to form a recess 23 which may be of curved form and registers with the center of the drill press in the operative position of the clamp therein for the accommodation of the drill or other tool used in the drill press at a given time.

In practice, the novel clamping device is mounted in place, for instance, in a drill press by means of the gripping members 5 and 6 which, as previously stated, may be secured upon the conventional column 5—a of the drill press by means of the member 8 and nut 10 as will be apparent. In this way, the bar 13 extends outwardly in tangential relation to the column 5—a above and over the bed-plate A of said drill press at a distance depending upon the work which is to be drilled and upon the distance of the drill from the column 5—a in the particular press.

In any case, the gripping members 5 and 6 are located upon the column 5—a at such height as to position the bar 13 at a level predetermined by the vertical or other controlling dimension of the work-piece B. The latter is placed and mounted on the bed-plate A of the drill press in conventional manner.

The top surface of the work-piece B may be indicated for the purpose of illustration and description by the line a in Fig. 3. At this stage, the forked pressure head 21 of the pressure member 20 may be located at a distance above this line a to facilitate the introduction of the work-piece B into place upon the bed-plate A. This adjustment of said forked pressure head 21 is automatically obtained by properly positioning the screw 18 and by reason of the fact that the latter and the dimensions of the lever 15 overbalance the pressure lever 20 and end 21 thereof.

To clamp the work-piece B in place on the bed-plate A, the screw 18 is rotatably actuated by the hand wheel 20 or its equivalent, to bear against the bottom of the recess 18 and to develop a force whereby the lever 15 and its associated elements are rocked on the pivot 16 in a direction to force the forked pressure head 21 toward the work-piece B and to bring the pressure exerting or clamping projection 22 thereof into engagement with the surface of the work-piece B. By continuing the described operation of the screw 18, the pressure exerting or clamping projection 22 will be forced into clamping engagement with the work-piece B to fix the same securely in place on the bed-plate A. As previously stated, the position of the clamping device may be such that the recess 23 of the forked end 21 registers axially with the center of the drill press and, accordingly, with the center of the drill or other operating tool being used.

After the drilling or other operation on the work-piece B has been completed, the screw 18 may be operated in the reverse direction to relieve the pressure of the projection 22 on said workpiece and thereby permit its removal from the press and its replacement by a subsequent workpiece after which, the operations described above may be repeated.

The novel clamping device is rotatably adjustable about the column 8 or equivalent machine part to various operative positions, and at the same time, is capable of linear adjustment and vertical shifting in the machine to thereby adequately meet, in an efficient manner, any and all conditions which may arise while the clamping device is in use.

The novel clamping device is of maximum simplicity both in construction and operation and requires no particular skill on the part of the operator in its utilization. The clamping device operates with maximum rapidity and, accordingly, provides for maximum output on the part of the drill press or other equivalent machine.

By exerting the clamping force whereby the work-piece B is held in place upon the bed-plate, upon opposite sides of the drill or equivalent tool of the machine, said tool is enabled to perform its operative functions with maximum efficiency and without the possibility of developing shifting forces tending to unintentionally shift the work-piece from its intended position in the machine.

Although the present invention has been described in conjunction with a preferred embodiment, it is to be understood that modifications and variations may be resorted to without departing from the spirit and scope of the invention, as those skilled in the art will readily understand. Such variations and modifications are considered to be within the purview and scope of the claims.

I claim:

1. A clamping device of the kind described comprising mounting means for removably mounting the device in operative position in a drill press or other machine, a bearing forming a part of said mounting means, a bar slidably mounted in said bearing for adjustment therein, means whereby said bar is fixed in an adjusted position in said bearing, clamping means pivotally mounted on said bar and extended forwardly thereof, and a clamping screw carried by said clamping means and positioned rearwardly of the pivot and having a bearing against said bar whereby operation of said screw will develop a clamping action in said clamping means.

2. A clamping device of the kind described comprising mounting means for removably mounting the device in operative position in a drill press or other machine, a bearing forming part of said mounting means, a bar slidably mounted in said bearing for adjustment therein; means for fixing said bar in an adjusted position in said bearing, a clamping member pivotally mounted on said bar and projecting downwardly and outwardly beyond one end thereof and having an inner end extending above the bar, and a clamping screw carried by said inner end of the clamping member inwardly of the pivot and bearing against said bar whereby operation of said screw will develop a clamping action in the free end of said clamping member.

3. A clamping device of the kind described comprising manually releasable mounting means for removably mounting the device in operative position in a drill press or other machine and adapted to permit swivel action, a bearing forming part of said mounting means, a bar slidably mounted in said bearing, means for fixing said bar in an adjusted position in said bearing, a clamping lever pivotally mounted in proximity to one free end of said bar, a boss carried by said clamping lever at its inward end above the bar and straddling said bar in spaced relation thereto, a pressure member constituting an extension of said clamping lever beyond a free end of said bar and terminating in a recessed pressure head, and a clamping screw in threaded engagement with said boss and bearing against an upper surface of said bar whereby operation of said clamping screw will develop a clamping action in the pressure head of said pressure member.

MAX WETZLER.

REFERENCES CITED

The following references are of record in the file of this patent:

UNITED STATES PATENTS

| Number | Name | Date |
|---|---|---|
| 702,217 | Jacobs | June 10, 1902 |
| 2,269,727 | Mead | Jan. 13, 1942 |
| 2,240,242 | Cole | Apr. 29, 1941 |
| 2,254,281 | Grey | Sept. 2, 1941 |
| 2,322,707 | Wetzler | June 22, 1943 |